(12) United States Patent  (10) Patent No.: US 7,941,406 B2
Sudhakar  (45) Date of Patent: May 10, 2011

(54) TECHNIQUES FOR SNAPSHOTTING

(75) Inventor: Gosukonda Naga Venkata Satya Sudhakar, Bangalore (IN)

(73) Assignee: Novell, Inc., Provo, UT (US)

( * ) Notice: Subject to any disclaimer, the term of this patent is extended or adjusted under 35 U.S.C. 154(b) by 356 days.

(21) Appl. No.: 11/930,434

(22) Filed: Oct. 31, 2007

(65) Prior Publication Data

US 2009/0055447 A1  Feb. 26, 2009

(30) Foreign Application Priority Data

Aug. 20, 2007  (IN) ............................. 1761/DEL/2007

(51) Int. Cl.
*E06E 17/007*  (2006.01)

(52) U.S. Cl. ..................... 707/657; 707/640; 707/649

(58) Field of Classification Search ................... 707/657
See application file for complete search history.

(56) References Cited

U.S. PATENT DOCUMENTS

| | | | |
|---|---|---|---|
| 5,379,417 A | 1/1995 | Lui et al. | |
| 5,819,292 A | 10/1998 | Hitz et al. | |
| 5,835,953 A * | 11/1998 | Ohran ........................... | 711/162 |
| 6,081,875 A * | 6/2000 | Clifton et al. ................. | 711/162 |
| 7,047,380 B2 * | 5/2006 | Tormasov et al. ............ | 711/162 |
| 7,257,606 B2 * | 8/2007 | Kapoor et al. .......... | 707/E17.01 |
| 2004/0103104 A1 | 5/2004 | Hara et al. | |
| 2004/0186900 A1 * | 9/2004 | Nakano et al. ................. | 709/213 |
| 2005/0138312 A1 | 6/2005 | Kubo et al. | |
| 2005/0216788 A1 * | 9/2005 | Mani-Meitav et al. ........... | 714/6 |
| 2006/0143412 A1 | 6/2006 | Armangau | |
| 2007/0130228 A1 | 6/2007 | Breau et al. | |
| 2009/0271456 A1 * | 10/2009 | Kushwah ....................... | 707/204 |

OTHER PUBLICATIONS

"VERITAS Storage Foundation for Windows:", *Veritas Software Corporation White Paper*, Subtitled: How VERITAS Storage Foundation for Windows Integrates with and Enhances Windows Server 2003 Volume Shadow Copy Service,(2003).

* cited by examiner

*Primary Examiner* — Charles Kim
*Assistant Examiner* — Sheryl Holland
(74) *Attorney, Agent, or Firm* — Schwegman, Lundberg & Woessner, P.A.

(57) ABSTRACT

Techniques are presented for snapshotting. Blocks associated with a storage volume are frozen from volatile access upon receipt of a snapshot request. Continued volatile access to the frozen blocks is permitted by transparently mapping each frozen block to an available block within the volume that is not associated with the snapshot. Volatile access continues on the available blocks.

19 Claims, 4 Drawing Sheets

FIG. 1A

After following operations on origin volume:
1. Write block 1
2. Write block 2
3. Write block 3 block group 1    block group 2    block group 3

Time T1: Snapshot S1 taken.
Time T2: Write comes for block 1 on origin
Time T3: Write comes for block 2 on origin Origin Read Snap (S1) Read

TECHNIQUES FOR SNAPSHOTTING

RELATED APPLICATIONS

The present application claims priority to India Patent Application No. 1761/DEL/2007 filed in the India Patent Office on Aug. 20, 2007 and entitled "TECHNIQUES FOR SNAPSHOTTING;" the disclosure of which is incorporated by reference herein.

BACKGROUND

Data and information are rapidly becoming the life blood of enterprises. Transactions with customers, operational data, financial data, corporate intelligence data; in fact, all types of information are now captured, indexed, stored, and mined by enterprises in today's highly competitive and world economy.

Since information is vital to the enterprise, it is often made available twenty-four hours a day, seven days a week, and three hundred sixty-five days a year. To achieve such a feat, the enterprises have to implement a variety of data replication, data backup, and data versioning techniques against their data warehouses.

For example, an enterprise may periodically capture the state of its data for a particular volume as a snapshot. If something should happen to the volume, it can be completely restored to the saved snapshot state. Another technique mirrors a volume on multiple volumes, such that if one volume is down or not accessible, another volume is automatically made available unbeknownst to the users. This is often referred to as data replication or failover support.

Today, it is not unusual for the average size of an enterprise's data warehouse to contain several terabytes of data. Yet, snapshot services work on the block level of data granularity for a particular volume and do not typically permit changes to a saved snapshot. Moreover, while a snapshot of volume is processing, access to the volume is permitted to proceed. Otherwise, accessibility to the volume becomes severely impaired. This means that for any given volatile operation that occurs when the snapshot is processing, there is typically (with a Copy-On-Write (COW) approach) three Input/Output (I/O) operations that take place. The first I/O operation is a read of the original pre-snapshot block (origin block). Next, the original pre-snapshot block is written to the snapshot storage ($2^{nd}$ I/O operation) and finally the modifying operation (volatile operation occurring post snapshot against the origin block) is written in the origin block ($3^{rd}$ I/O operation).

One appreciates in this scenario that access to the volume can be severely hampered during snapshot processing, if for every volatile operation three I/O operations have to take place. In fact, in a large transactional-based environment, the volume may even become unresponsive during a snapshot as bandwidth and processing capabilities become fully taxed with all the I/O operations taking place.

To alleviate this, there is one alternative approach in the industry referred to as Write Anywhere File Layout (WAFL). With WAFL, a single I/O operation is performed on an origin block when a volatile operation is made against it during snapshot processing. WAFL works on a file-level granularity and not a block-level granularity. So, any file-level operations with WAFL are translated on the backend to block level operations. Therefore, a single write operation is done on a new and unallocated block associated with the volume. In other words, the write operations are not done in a sequential or serial grouping manner within the storage volume. So, the write operations occur on any available block on the volume; accordingly, fragmentation of the volume becomes a commonplace and a likely scenario with WAFL-based techniques. Furthermore, the performance of other storage volume operations is impaired following a WAFL-based approach because of the volume fragmentation produced with WAFL.

As a result, there is a need for improved snapshotting techniques that use a minimum amount of I/O operations and that minimize volume fragmentation.

SUMMARY

In various embodiments, techniques are provided for snapshotting storage volumes. More particularly and in an embodiment, a method is provided for snapshot processing against a storage volume. A snapshot of a volume is taken by freezing writes to existing blocks that have data on the volume. A write request is then received for a particular block number, which is associated with the existing blocks; the write request is received after the snapshot is taken. An offset is added to the particular block number to acquire a different block number from those block numbers that are associated with the existing blocks and the write request is processed within the different block number represented by the offset.

DETAILED DESCRIPTION

A "snapshot" refers to a captured and recorded state of data housed within a storage volume at a particular point in time. Following a snapshot, write access to the blocks associated with the snapshot is restricted. Read access (non volatile operation) can be done against a snapshot, since this does not alter the state of the captured data on the volume.

The snapshot processing occurs against a storage volume being snapshotted. Additionally, the snapshot itself can be copied during a snapshot to an entirely separate and independent volume, if desired. In some cases, a snapshot can reside within the same volume that it was taken from as a logical and virtual volume. Multiple snapshots can be done on a single volume. The maximum number of permissible snapshots is an administrative configured parameter based on the characteristics, size, enterprise policy, and limitations of the storage volumes involved in snapshot processing.

According to an embodiment, the techniques presented herein may be implemented within Novell products distributed by Novell, Inc. of Provo, Utah. Of course it is to be understood that any network architecture, device, proxy, operating system (OS), or product may be enhanced to utilize and deploy the techniques presented herein and below.

It is within this context that embodiments of the present invention are discussed with reference to the FIGS. 1-4.

Figure 1A:
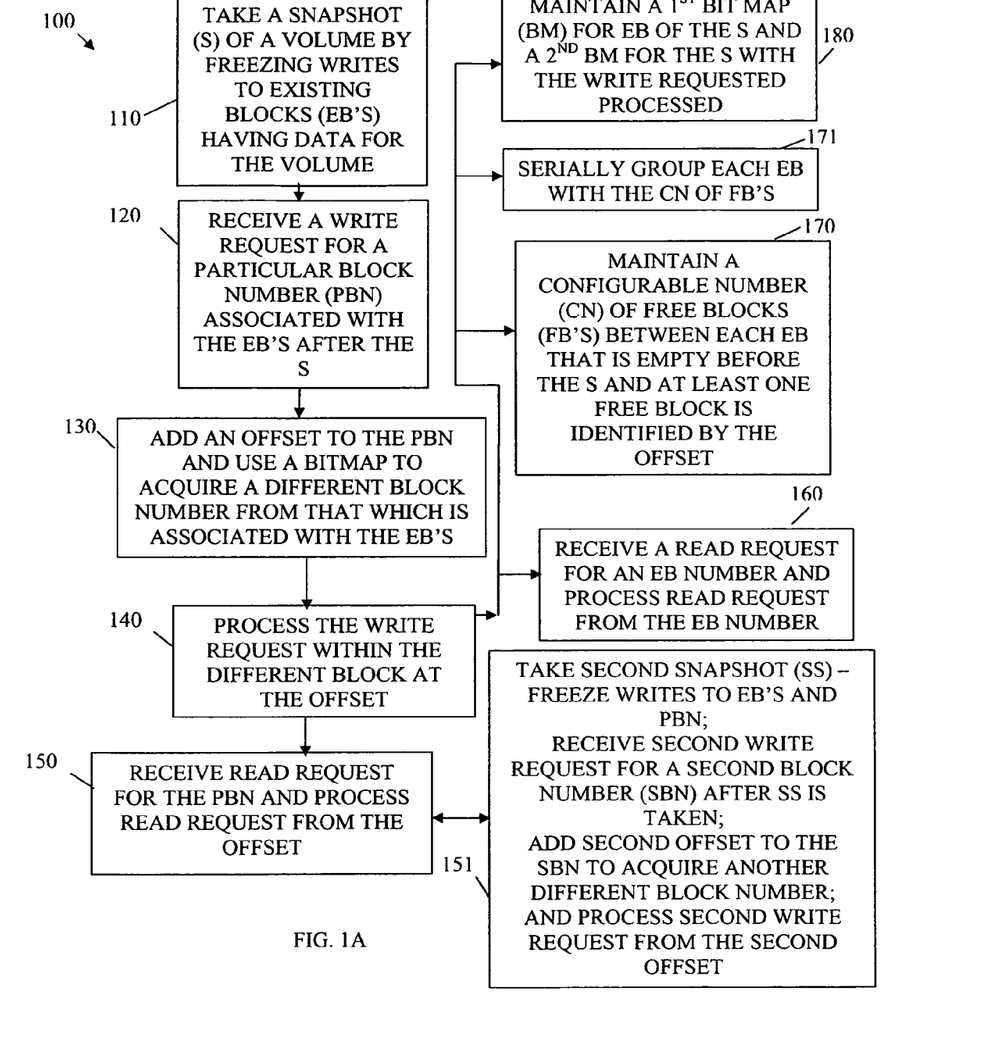
FIG. 1A is a diagram of a method for snapshotting a storage volume, according to an example embodiment.

FIG. 1A is a diagram of a method 100 for snapshotting a storage volume, according to an example embodiment. The method 100 (hereinafter "snapshot service") is implemented in a machine-accessible and machine-readable medium and is accessible over a network. The network may be wired, wireless, or a combination of wired and wireless.

In an embodiment, the snapshot service is implemented as an enhancement service to a storage area network (SAN) manager. The snapshot service may also be implemented as a standalone module or service that is designed to interface with a device or block level manager associated with an existing SAN manager to facilitate the techniques described herein and below.

At 110, the snapshot service takes a snapshot of a storage volume. When the snapshot is first requested and processing begins, the snapshot service freezes any subsequent write operations or volatile operations against existing blocks that have data on the volume being snapshotted. Pending I/O (volatile and non volatile) may be flushed from memory and processed before the freezing takes place, assuming the pending I/O existed before the snapshot was requested.

At 120, the snapshot service recognizes or receives notification of a write request for a particular block number, which is associated with the existing block numbers that have been frozen for volatile access. The write request is received after the snapshot request is received or after the snapshot is taken.

At 130, the snapshot service adds an offset value to the particular block number associated with the write request to acquire an entirely different block number. The different block number, which is acquired via the offset, is not associated with any of the block numbers that comprise the existing blocks for which the snapshot was taken. In essence, the different block number is a free and unused block located on the volume. Such a block number is reserved on the volume for the novel snapshot processing discussed herein; so that it is available when needed from the volume. The offset may be used in combination with a bitmap mechanism (discussed more completely here and below) for purposes of directly acquiring the proper block to read from and write to and any particular point in time.

At 140, the snapshot service processes the write request within the different block number using the offset. So, unlike Copy-On-Write (COW) based approaches where post snapshot writes entail three I/O operations, the teachings presented herein allow for a single I/O operation. This is more efficient and significantly improves snapshot processing performance. In addition, the offset ensures that the single write operation is processed in a serial and organized fashion within the volume; which alleviates the fragmentation problems associated with Write Anywhere File Layout (WAFL) approaches.

According to an embodiment, at 150, the snapshot service subsequently receives a read request for the particular block number, which was also associated with the write request that followed the snapshot. Thus, the read is processed at the different block number acquired via the offset in a transparent fashion from the requesting application. The requesting application believes access is on the requested block number but because a snapshot was taken and a write occurred after that snapshot and before the read request was received, the snapshot service ensures the requested block number is adjusted by the offset (in combination with a bitmap (discussed below) to read data from the proper block number. Example illustrations of this and other scenarios are presented herein and below for purposes of comprehension.

In continuing with the example embodiment presented above, at 151, the snapshot service takes a second snapshot on the volume in response to another snapshot being requested. When this second snapshot is requested, the snapshot service again freezes write operations or volatile access to the existing blocks of the volume having data and also to the particular block (associated with the write operation following the first snapshot). Next, a second write request may be received for a second block number after the second snapshot. When this occurs, the snapshot service adds a second offset to the second block number to acquire yet another different block number from the volume. The second write request is then processed from the block number identified by the second offset.

So, the technique used to perform a single and organized write operation on a volume that has been snapshotted can be nested to permit multiple snapshots to take place on the volume. As single nested instance was detailed with respect to the processing at 151.

In an embodiment, at 160, the snapshot service processes a non volatile operation from the snapshot or the existing blocks. In other words, when a read request is received for an existing block number associated with the snapshot, the snapshot service can service that read request with data acquired from the requested existing block number. This is so, because a read operation is non volatile and this is so when the requested block number has not been changed in the intervening time from the snapshot to when the read request was received. If the data at the requested block had been changed after the snapshot, then the snapshot service will satisfy the read from the adjusted block number as described above with the processing associated with 150.

In some cases, at 170, the snapshot service maintains a configurable number of free blocks within the volume between each of the existing blocks. The free blocks are reserved and initially empty before the first snapshot is taken on the volume. Moreover, at least one of these free blocks represents the offset discussed with respect to handling the write request processing at 130 and 140. In other words, the volume is partitioned in such a manner that each available block to a user or application appears to be serial (1, 2, 3, 4, etc.) but in fact each available block is equally spaced out as (1, 6, 11, 16, etc) in groupings. The snapshot service manages the offset and the mapping when a user requests block 2 to make sure it is really processing block 6 of the volume. The intervening blocks (2-5, 7-10, 12-15, etc.) are the free blocks set aside and reserved for snapshot processing. Thus, at 171, the blocks are actually put into serial groupings. So, in the examples presented above the configurable number is 4, representing 4 blocks for each available block accessible to the user or application; each user-accessible block is grouped with the 4 free blocks. Thus, Group 1 includes blocks 1-5; Group 2 includes blocks 6-10; Group 3 includes blocks 11-15; Group 4 includes blocks 16-20, etc.

For example, if a first snapshot is taken on blocks 1, 6, 11, 16, etc. and then a user modifies via a write what he/she believes to be block 2 (mapped to block 6); the snapshot service processes that write on block 7, the first available block in the group associated with block 2 (that maps to block 6). Now when the same user requests a read of block 2, the snapshot service processes the read from block 7. A bitmap entry shows directly that block 7 is the origin or master for block 2. The total number of free blocks (configurable number) can represent a maximum number of permissible snapshots on the volume at any particular point in time.

In continuing with the example illustration, suppose further that a second snapshot is requested after the write occurred on block 7, which the user believed to be block 2. Here, the second snapshot consists of blocks 1, 7, 11, 16, etc. If the user then again processes a write on what the user believes to be block 2 (currently block 7 in the second snapshot), the snapshot service processes the write on block 8

(second available block in the free block grouping associated with original Group 2 (6-10). This can continue for 4 snapshots with the example presented. Again, the reserved free blocks for each available user or application block on the volume is an administrative configured setting or policy driven setting representing a maximum number of permissible snapshots on the volume at any particular point in time. It is noted that policy may permit a fifth snapshot to be taken in the above example but when this happens it writes over the first snapshot taken and recorded for the volume, such that at any particular point in time only 4 snapshots are available for the volume.

In an embodiment, at 180, the snapshot service maintains a bit map for each existing block of the snapshot taken. This bitmap shows the blocks on the volume that comprise the first snapshot. So, in the example above, a bit map for the first snapshot may appear as 1000010000100001, where the 1's correspond in the bit string to block numbers 1, 6, 11, and 16. Another bit map may be used to represent the action taken following the snapshot on what the user believed to be block 2 as 1000001000100001; here a 1 in the 7 position of the bit map string indicates that block 2 is acquired from block 7 (the location of the modified block that the user processed a write on after the first snapshot. These bit maps can be used for each of the snapshots processed on the volume and provide direct access to the proper blocks being requested by a user at any particular point in time and can be used to acquire prior versions that a user may request at any point in time. In other words, a user may want to see a first snapshot version of a block before any changes were applied and the bit maps provide a quick mechanism for providing that functionality to the user from the volume.

As still further illustrations of the processing associated with the snapshot service consider the following. A hard disk device can include many logical volumes on it. These are virtual disks, which can be mounted. A volume manager (such as EVMS (Enterprise Volume Management System) or LVM (Logical Volume Manager) in Linux) and a device mapper (DM in Linux) manage these logical volumes. A first logical volume of the disk is partitioned or organized in such a manner that for each available block there is another 4 free blocks. When a write operation comes in from a user or application using the first logical volume of the disk, the device mapper (modified to include the snapshot service processing) ensures the operation is performed on the proper block (1, 6, 11, 16, 21, etc.) when the user or application requests blocks 1, 2, 3, 4, 5, etc. The blocks are assembled into serial groupings, so Group 1 includes blocks 1-5; Group 2 includes blocks 6-10, and so on as discussed above.

So, when a snapshot S1 is taken, if a subsequent write operation is requested for block 1 in the origin volume, then write operation is processed in block 2. Essentially, block 2 is marked for its origin as being block 1. Thus, if a read comes in for block 1 in the origin it is read from block 2. However, when a read comes in for block 1 in S1 (snapshot version specifically requested), the data is read from block 1. If still another snapshot S2 is taken from the origin volume, and a write operation is requested for block 1 in the origin, then write operation is processed in block 3 (next available sequential block in Group 1 of blocks (1-5)) and the origin of block 3 is marked as being block 1. A read requested for block 1 is now read from block 3 and not block 2. However, if a read comes in for block 1 in S2 (specific version S2 requested) then it is satisfied by reading block 2 as it represents the version of block 1 for S2.

The marking of which block belongs to which logical volume of the hard disk (i.e., origin, S1, S2, etc.) is achievable via a bit map mechanism (as discussed above). So, if block 1 and 6 (representing logical block 1 and 2 to a user or application) are assigned as a pre-snapshot version of the logical volume being snapshotted, then the bitmap appears as "10000 10000." After S1 is taken with a write being processed thereafter against block 1 but actually written to block 2, the bit map appears as "01000 10000." The bitmap for S1 and the bitmap for the write after S1 or the most recent state of the logical volume can be housed in memory and/or storage (for recovery on failure).

In an embodiment, the bitmap is housed in Non Volatile Random Access Memory (NVRAM). This improves access to the bitmap, ensures its available in the event of power loss, and improves overall processing throughput.

It is now appreciated how a single I/O can be performed for post snapshot volatile operations on a volume and how that write occurs in a serial or logical location within the volume that is not random and not significantly fragmented. This provides improved snapshotting capabilities over the traditional COW and WAFL based approaches.

Figure 1B:
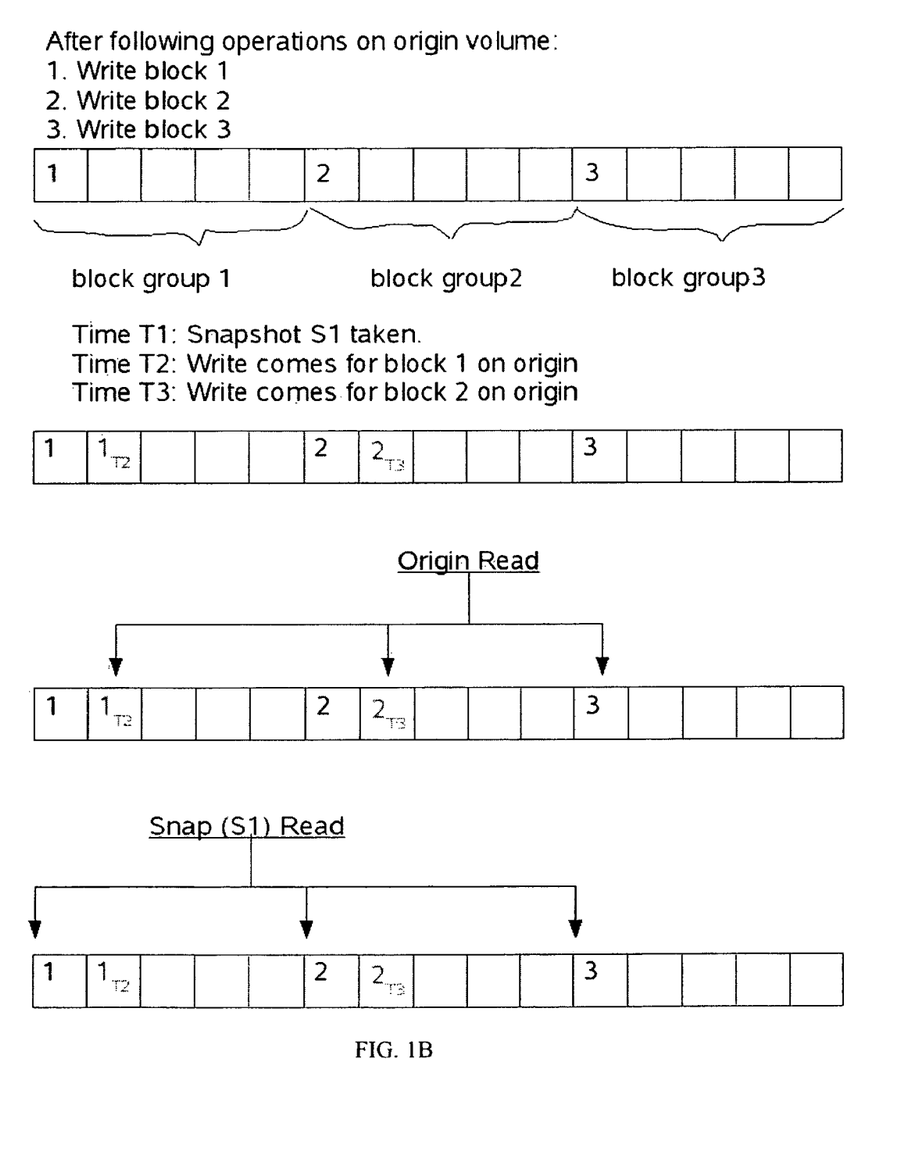
FIG. 1B is an example visual illustration of operations taken by the method represented by FIG. 1A, according to an example embodiment.

FIG. 1B is an example visual illustration of operations taken by the method represented by FIG. 1A, according to an example embodiment. The diagram depicted in FIG. 1B shows two actions and read operations that follow those actions.

The first action shows the state of an origin volume after three blocks 1-3 are written to the origin volume. After each block (1, 2, and 3) there are free blocks that remain unused or reserved on the volume. Each set of blocks and free blocks are organized into block groups (block groups 1, 2, and 3).

The second action identifies three operations occurring at different times. T1 represents a time when a snapshot S1 is taken. T2 represents a write that comes in for block 1 on the origin volume; and T3 represents a write that comes in for block 2 on the origin volume. Notice that T2's write on block 1 occurs in the first free block available in the block group 1 and that T3's write on block 2 occurs in the first free block available in the block group 2.

The "Origin Read" shows where blocks 1, 2, and 3 are read from when a read comes in following the S1. The read for blocks 1 and 2 occur from the free blocks whereas since no write occurred on block 3 it is read from its original location on the volume. Yet, if a read for S1 is done (meaning the snapshot version of the blocks is desired with the read), then the reads occur on the original block locations of the volume (shown as "Snap (S1) Read" in the diagram).

The bitmap during the read process for the S1 and for the origin or master identifies which block to take the read from on the volume. S1 has a bitmap showing the proper location for blocks 1, 2, and 3 as it is when S1 occurred. The writes following S1 have a bitmap showing the origin or master for each block and its location on the volume (so block 1 and 2 are taken from blocks 2 (block 1) and 7 (block 2) in the diagram).

Figure 2:
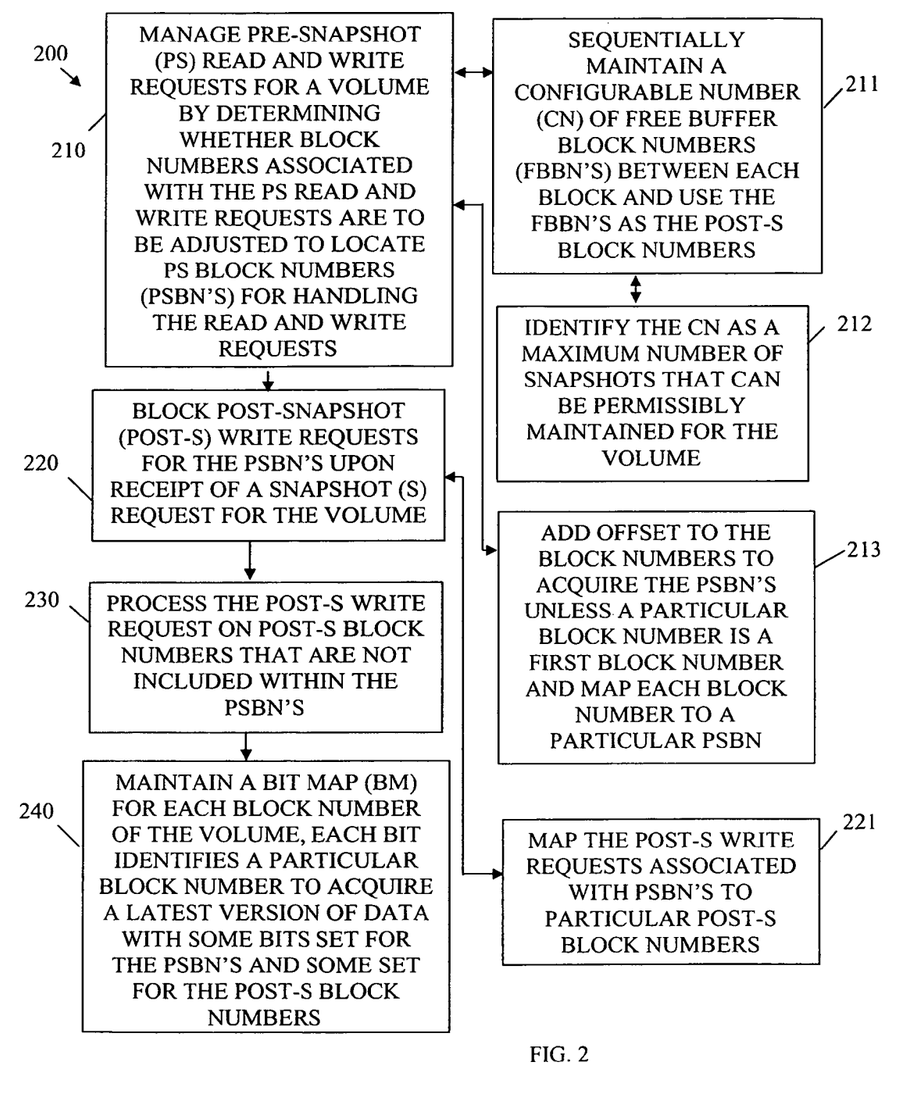
FIG. 2 is a diagram of another method for snapshotting a storage volume, according to an example embodiment.

FIG. 2 is a diagram of another method 200 for snapshotting a storage volume, according to an example embodiment. The method 200 (hereinafter "snapshot management service") is implemented in a machine-accessible and readable medium and is accessible over a network. The network may be wired, wireless, or a combination of wired and wireless. The snapshot management service presents an alternative perspective and in some cases an enhanced version of the snapshot service represented by the method 100 of the FIG. 1A.

At 210, the snapshot management service manages pre-snapshot read and write requests for a volume by determining whether block numbers associated with the pre-snapshot read and write requests are to be adjusted to locate pre-snapshot block numbers for handling read and write requests. Example adjustments, via adding an offset mechanism with a bitmap mechanism, were discussed in detail above with reference to the method 100 of the FIG. 1A. The requesting user or application believes that it is serially accessing the logical volume with a particular block number, the snapshot management service maps or adjusts that block number when needed to an actual block number for processing the request. The operations may be volatile (writes) or non volatile (reads).

According to an embodiment, at 211, the snapshot management service sequentially maintains a configurable number of free buffer blocks on the logical volume for each pre-snapshot block number. So, each pre-snapshot block number includes a set of additional free buffer blocks, the size of the set is the configurable number. As will be described more completely below, these free buffer blocks are used as post-snapshot buffer numbers. At 212, the snapshot management service can identify the configurable number based on a permissible maximum number of snapshots that can be used for the logical volume at any particular point in time. Examples of grouping blocks into sets were discussed above in detail with reference to the method 100 of the FIG. 1A.

In another case, at 213, the snapshot management service adds an offset to the block numbers to acquire the pre-snapshot block number unless the particular block number requested is a first block number. So, the user or application believes that serial blocks 1, 2, 3, etc. are being requested and the snapshot management service adds some offset to the requested block number to get the actual pre-snapshot block number being requested. In the continuing example this is 1, 6, 11, etc. Notice that no offset is added to the first block and notice the offset can itself be a repeating series that can be calculated as (previous actual block number+configurable number+1), where requested block 2 becomes 1 (previous actual block number+4 (number of free buffer blocks between each available block)+1=6. For requested block 3 the offset calculation is 6 (previous actual block number+4 (configurable number)+1=11.

Offsets and bitmaps compliment one another to locate the proper location for any given block on the volume. As was discussed above, a bitmap is used for each active block, where bit locations identify block numbers and a set bit indicates the current block holding that data. So, in the above example a bitmap may be used to show "10000 10000 10000" as a pre-snapshot location for blocks 1, 2, and 3 being in actual block numbers 1, 6, and 11.

At 220, the snapshot management service blocks any post-snapshot write requests for the pre-snapshot block numbers upon receipt of a snapshot request. So, block numbers comprising the snapshot that is requested (the pre-snapshot block numbers) are locked down such that no additional volatile operations occur on them. However, it is noted that policy may permit pending volatile I/O to be flushed from memory and processed before the snapshot is processed, assuming this I/O existed and was as yet unprocessed at the time the snapshot was requested.

At 221, the snapshot management service maps the post-snapshot write requests associated with particular pre-snapshot buffer numbers to particular post-snapshot block numbers. The post-snapshot buffer numbers are mapped in the manners discussed above with reference to the method 100 of the FIG. 1A and with reference to the processing discussed at 213 (offsets, bitmaps, etc.).

At 230, the snapshot management service processes the post-snapshot write requests on the post-snapshot block numbers. Again, the post-snapshot block numbers are not included within the pre-snapshot block numbers. The post-snapshot block numbers are set aside and reserved on the logical volume for usage after the snapshot takes place.

According to still another embodiment, at 240, the snapshot management service can (as was discussed at length above) maintain a bitmap for each block number that is available on the logical volume to a user or an automated application. The position within the bitmap string for a set bit (bit with value of "1") identifies the current block number within the volume to acquire the latest version of data for that block. Again, an abundance of examples demonstrating this was presented above.

Figure 3:
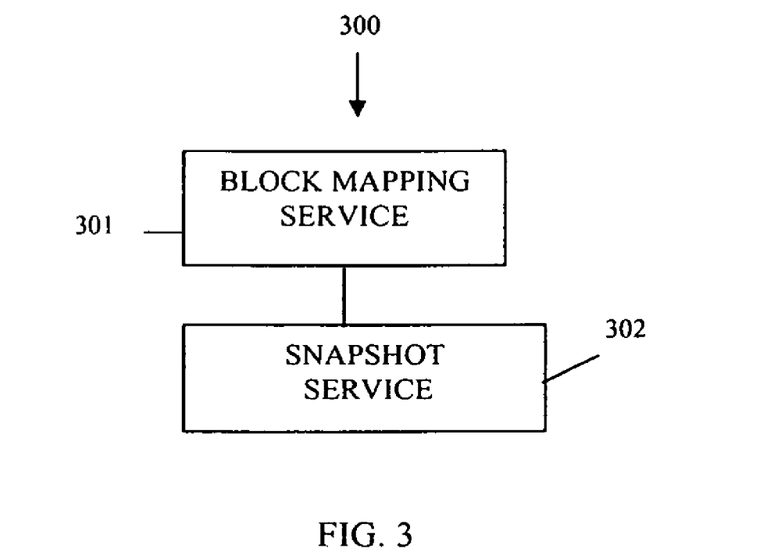
FIG. 3 is a diagram of a storage snapshot system, according to an example embodiment.

FIG. 3 is a diagram of a storage snapshot system 300, according to an example embodiment. The storage snapshot system 300 is implemented in a machine-accessible and readable medium and is accessible over a network. The network may be wired, wireless, or a combination of wired and wireless. In an embodiment, the storage snapshot system 300 implements, among other things, various aspects of the methods 100 and 200 of the FIGS. 1 and 2, respectively.

The storage snapshot system 300 includes a block mapping service 301 and a snapshot service 302. Each of these and their interactions with one another will now be discussed in turn.

The block mapping service 301 is implemented in a machine-accessible and readable medium and is to process on a machine of the network. Example processing of the block mapping service 301 was presented in detail above with reference to the snapshot service represented by the method 100 of the FIG. 1A and with reference to the snapshot management service represented by the method 200 of the FIG. 2.

The block mapping service 301 dynamically monitors and adjusts block numbers identified in data storage operations occurring against a logical volume of a hard disk device. The block numbers are adjusted for pre-snapshot locations within the logical volume. So, if a user or application requests block 2 (user requested location), the block mapping service 301 modifies this to be block 6 (adjusted location) in the logical volume, assuming the running example presented herein and above. The block mapping service 301 also adjusts for post-snapshot locations. Thus, if a snapshot is performed and then a write request is processed for a user requested block 2, the block mapping service 301 adjusts block 2 to block 7 (one past block 6, which represents the snapshot).

According to an embodiment, the block mapping service 301 sequentially maintains within the logical volume a configurable number of unused blocks (pre-snapshot) between each available block (as known to the user or an application). Each available block is identified as a particular pre-snapshot location on the logical volume and each unused block is identified as a particular post-snapshot location on the logical volume that can be used for volatile operations following the snapshot but remains unused before the snapshot is requested.

In another case, the block mapping service 301 maintains a serial pool of groupings of unused blocks on the logical volume. Each grouping is serially represented within the volume and each grouping is mapped to a particular available block (pre-snapshot). Each unused block within each grouping mapped to a particular pre-snapshot location and available for use as a post-snapshot location following a snapshot but remains unused before the snapshot. Once used each post-snapshot location represents a modification made to data associated with a mapped pre-snapshot location, where that modification occurred after a snapshot was requested.

The block mapping service 301 can adjust the pre and post-snapshot locations in a variety of manners, such as via offset calculations, via bitmaps, or even via a table to map user or application requested volume locations to actual volume locations. Examples of this were discussed at length herein and above.

The snapshot service 302 is implemented in a machine accessible and readable medium and is to process on the machine of the network. Again, example processing of the snapshot service was presented in detail above with reference to the methods 100 and 200 of the FIGS. 1 and 2, respectively.

The snapshot service 302 freezes volatile operations for the pre-snapshot locations when a snapshot of the logical volume is requested and communicates the snapshot request to the block mapping service 301. This lets the block mapping service 301 know that it is to start using post-snapshot locations in the volume for any data operations. If no changes are made to a particular block when a non volatile operation is requested and the operation is after a snapshot, then the block mapping service can use the master block for processing the operation from the adjusted pre-snapshot location. For example, if a snapshot is taken and block 1 is modified but not block 2 and then a read operation is received for both block 1 and block 2, the block mapping service acquires block 1 as being block 2 and block 2 as being block 7.

Figure 4:
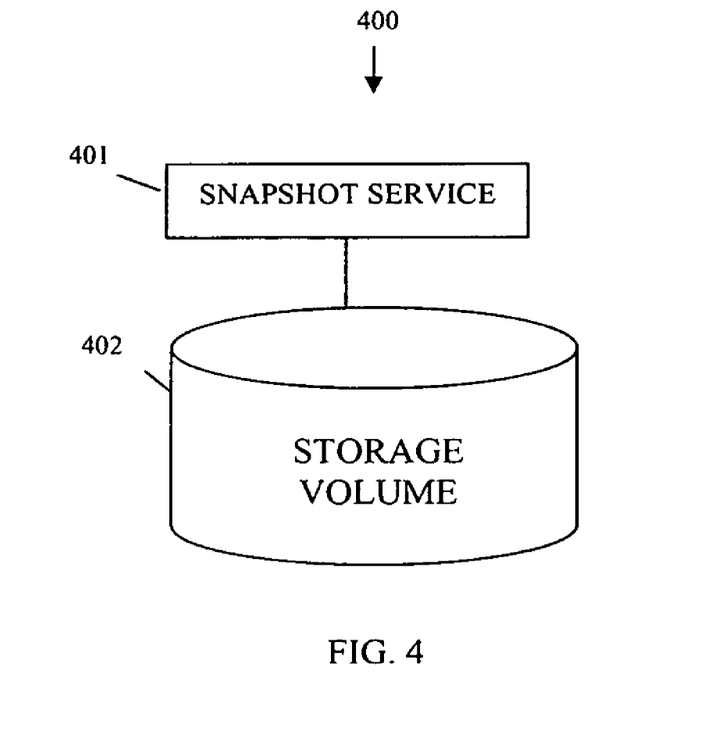
FIG. 4 is a diagram of another storage snapshot system, according to an example embodiment.

FIG. 4 is a diagram of another storage snapshot system 400, according to an example embodiment. The storage snapshot system 400 is implemented in a machine-accessible and readable medium is accessible over a network. The network may be wired, wireless, or a combination of wired and wireless. In an embodiment, the storage snapshot system 400 implements various aspects associated with the methods 100 and 200 of the FIGS. 1 and 2, respectively, and the system 300 of the FIG. 3.

The storage snapshot system 400 includes a snapshot service 401 and a storage volume 402. Each of these and their interactions with one another will now be discussed in detail.

The snapshot service 401 is implemented in a machine-accessible and readable medium and is to process on a machine of the network. Example processing associated with the snapshot service 401 was presented above with reference to the methods 100 and 200 of the FIGS. 1 and 2, respectively and with reference to the system 300 of the FIG. 3.

The snapshot service 401 is to block write access to a first set of blocks when a snapshot request is received. The snapshot service 401 is to also permit write operations (or any other volatile operations, e.g., deletes, creates, etc.) to proceed on a second set of blocks when those write operations are attempted on a number of the first setoff blocks after the snapshot request is received. In other words, to a user or an application the storage volume 402 appears to be serial blocks 1, 2, 3, etc. that can be accessed. The snapshot service 401 may actually make the first set of blocks be partitioned on the storage volume as blocks 1, 6, 11, etc. Once the first snapshot is requested the first set 1, 6, and 11 can no longer have volatile operations as they are now snapshotted. So, when the user makes a request for the first set the snapshot service 401 permits the volatile operations being requested to process on a second set of blocks (2-5, 7-10, 12-15).

So, specific blocks in the first set map to specific blocks of the second set. In the example, block 1 maps to blocks 1-5 (2-5 available post snapshot for volatile operations), block 2 maps to blocks 6-10 (7-10 available post snapshot for volatile operations, and block 3 maps to blocks 11-15 (12-15 available post snapshot for volatile operations).

According to an embodiment, each block in the first set of blocks is followed by two or more ones of the second set of blocks within the storage volume 402. So, at a minimum at least one snapshot can be taken. So, if blocks 1 and 2 were available on the storage volume 402 to a user, there is at a minimum 4 blocks in the set of blocks consisting of blocks 1, 2, 3, and 4. Blocks 1 and 2 of the second set maps to block 1 of the first set and blocks 3 and 4 of the second set maps to block 2 in the first set. In this example, at least one snapshot can be taken with additional volatile operations following the snapshot permitted; this is so because for blocks 1 and 2 of the first set blocks 1 and 3 of the second set can be locked down as a first snapshot and then blocks 2 and 4 of the second set can be used for changes that follow the snapshot in the second set.

It is understood that the actual size of the second set can be configured based on policy and/or physical limitations of the storage volume 402 and its associated hard disk device. So, in another embodiment, each block in the first set of blocks is grouped with a configurable number of blocks associated with the second set of blocks. In some cases, the configurable number reflects a maximum number of permissible snapshots that can be retained at any point in time for the storage volume 402.

The storage volume 402 is implemented in a machine-accessible and readable medium and is accessible to and readable by the snapshot service 401 from the machine that the processes the snapshot service 401. Various aspects of the storage volume 402 were discussed above with reference to the methods 100 and 200 of the FIGS. 1 and 2, respectively and with reference to the system 300 of the FIG. 3.

The storage volume 402 is a logical volume that can be mounted on a physical storage disk device. The disk can include a plurality of logical and/or virtual volumes. Each volume represented by a plurality of blocks. Users and applications access the blocks via high level constructs, such as file references. The second set of blocks discussed above are sequentially and serially ordered within the storage volume 402 so as to minimize fragmentation and improve performance of operations that process against the storage volume 402. The serial nature of this arrangement can occur immediately following a particular first set block such as blocks 2-5 associated with first set block 1 or the serial nature can occur as a grouping or pool somewhere else on the storage volume. An example, of this latter situation may be as follows. Suppose the first set is comprised of blocks 1-3, the second set may include groupings of 4 for each of the first blocks for a total of 12 additional blocks for usage with 4 snapshots. The extra blocks for block 1 may serially begin within the storage volume 402 at block number 4 and continue to block 7, blocks 8-11 are for block 2, and blocks 12-15 are for block 3. This is still a serial arrangement of the free blocks on the storage volume 402, but each set of free blocks begins after the last block included in the first set of blocks.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method implemented and residing in a non-transitory computer-readable medium, comprising:
   taking a snapshot of a volume by freezing writes to existing blocks having data for the volume;
   receiving a write request for a particular block number associated with the existing blocks after the snapshot is taken, the particular block number maps to one of the existing blocks that was frozen, the write request changing some of the data on that frozen existing block;
   adding an offset to the particular block number to acquire a different block number from those block numbers that are associated with the existing blocks;
   processing the write request within the offset at the different block number and managing the snapshot by mapping requests to the particular block number to the different block number maintained outside the snapshot, the different block number set aside and reserved on a same volume that holds the snapshot;
   maintaining a configurable number of free blocks between each existing block, wherein each free block is empty before the snapshot is taken, and wherein at least one of the free blocks is identified by the offset and used to process the write request after the snapshot is taken; and
   further comprising, serially grouping each existing block with the configurable number of the free blocks within the volume.

2. The method of claim 1 further comprising:
   receiving a read request for the particular block number; and
   processing the read request from the offset.

3. The method of claim 1 further comprising:
   receiving a read request for an existing block number included within the existing blocks, wherein data associated with the existing block number remains unchanged since the snapshot was taken; and
   processing the read request from a existing block number.

4. The method of claim 1 further comprising, maintaining a first bit map for the existing blocks reflecting the snapshot and a second bit map for the snapshot having the write request processed, wherein the second bit map identifies the offset as being a master source location for the particular block number.

5. The method of claim 2 further comprising:
   taking a second snapshot for the volume by freezing writes to the existing blocks and the particular block associated with the particular block number;
   receiving a second write request for a second block number associated with the existing blocks or the particular block after the second snapshot is taken;
   adding a second offset to the second block number to acquire another different block number from those block numbers that are associated with the existing blocks and the particular block; and
   processing the second write request from the second offset.

6. A method implemented and residing in a non-transitory computer-readable medium, comprising:
   managing pre-snapshot read and write requests for a volume by determining whether block numbers associated with the pre-snapshot read and write requests are to be adjusted to locate pre-snapshot block numbers for handling the read and write requests, sequentially maintaining configurable number of free buffer block numbers between each block number, and identifying the configurable number as a maximum number of snapshots that can be permissibly maintained for the volume at any particular point in time, and using the free buffer block numbers as the post-snapshot block numbers;
   blocking post-snapshot write requests for the pre-snapshot block numbers upon receipt of a snapshot request for the volume; and
   processing the post-snapshot write requests on post-snapshot block numbers that are not included within the pre-snapshot block numbers by writing the write requests to the post-snapshot block numbers and mapping any subsequent requests directed to the pre-snapshot block numbers to the post-snapshot block numbers for servicing those subsequent requests, the post-snapshot block numbers are set aside and reserved on the volume of the snapshot.

7. The method of claim 6 further comprising, maintaining a bit map for each block number of the volume, wherein each bit in the bit map identifies a particular block number to acquire a latest version of data for the volume with some bits set for pre-snapshot block numbers and other bits set for post-snapshot block numbers.

8. The method of claim 6, wherein managing further includes adding an offset to the block numbers to acquire the pre-snapshot block numbers unless a particular block number is a first block number.

9. The method of claim 6, wherein managing further includes mapping each block number to a particular pre-snapshot block number.

10. The method of claim 6, wherein blocking further includes mapping the post-snapshot write requests associated with particular pre-snapshot block numbers to particular post-snapshot block numbers to ensure that no write operations are processed on pre-snapshot block numbers after the receipt of the snapshot request for the volume.

11. A system, comprising:
    a block mapping service implemented in a non transitory and computer-readable medium and to process on a machine; and
    a snapshot service implemented in a non transitory and computer-readable medium and to process on the machine;
    the block mapping service is to adjust block numbers identified in data operations occurring on a volume for pre-snapshot locations and post-snapshot locations, and the snapshot service is to freeze volatile operations for the pre-snapshot locations when a snapshot of the volume is requested and is to communicate the snapshot to the block mapping service for it to begin using the post-snapshot locations for the volatile operations that occur on the volume after the snapshot is requested, subsequent requests directed to pre-snapshot locations that were changed are mapped and serviced from the post-snapshot locations but are still referenced via the pre-snapshot locations, the post-snapshot locations are set aside and reserved on the volume having the pre-snapshot locations, and the block mapping service is to sequentially maintain a configurable number of unused blocks between each available block of the volume, wherein each available block is identified as a pre-snapshot location and each unused block is identified as a post-snapshot location that can be used for the volatile operations following the snapshot but remains unused before the snapshot.

12. The system of claim 11, wherein the block mapping service is to maintain a pool or unused blocks on the volume, each unused block is identified as a post-snapshot location that can be used for the volatile operations following the snapshot but remains unused before the snapshot.

13. The system of claim 11, wherein the blocking mapping service is to adjust the block numbers by adding an offset.

14. The system of claim 11, wherein the blocking mapping service is to adjust the block numbers by accessing a table to acquire a mapping for each particular block number.

15. The system of claim 12, wherein each unused block, once used following the snapshot, maps to a particular pre-snapshot location and represents modifications made to data housed in the pre-snapshot location that occurred following the snapshot.

16. A system, comprising:
a snapshot service implemented in a non transitory and computer-readable medium and to process on a machine; and
a storage volume accessible to and readable by the snapshot service from the machine;
the snapshot service is to block write access to a first set of blocks when a snapshot request is received and is to permit write operations to proceed on a second set of blocks when those write operations are attempted on a number of the first set of blocks after the snapshot request, and specific ones of the first set of blocks map to specific ones of the second set of blocks, and the first set of blocks and the second set of blocks are included in the storage volume, and subsequent requests directed to first set of blocks of the snapshot are mapped and serviced from the second set of blocks outside the snapshot, the second set of blocks are set aside and reserved on the storage volume having the snapshot and a configurable number of free blocks between each existing block is maintained, wherein each free block is empty before the snapshot is taken, and wherein at least one of the free blocks is identified by the offset and used to process the write request after the snapshot is taken; further comprising, serially grouping each existing block with the configurable number of the free blocks within the volume.

17. The system of claim 16, wherein each block in the first set of blocks is followed by two or more ones of the second set of blocks within the storage volume.

18. The system of claim 16, wherein each block in the first set of blocks is grouped with a configurable number of blocks associated with the second set of blocks.

19. The system of claim 18, wherein the configurable number reflects a maximum number of permissible snapshots that can be retained at any point in time for the storage volume.

* * * * *